United States Patent
Yamaguchi et al.

(10) Patent No.: US 6,908,301 B2
(45) Date of Patent: Jun. 21, 2005

(54) CONTROL FOR CATALYTIC COMBUSTOR

(75) Inventors: Koichi Yamaguchi, Yokohama (JP); Tadashi Shoji, Yokosuka (JP); Tadashi Matoba, Yokohama (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 10/398,905

(22) PCT Filed: Nov. 12, 2002

(86) PCT No.: PCT/JP02/11765
§ 371 (c)(1),
(2), (4) Date: Sep. 29, 2003

(87) PCT Pub. No.: WO03/052846
PCT Pub. Date: Jun. 26, 2003

(65) Prior Publication Data
US 2004/0040281 A1 Mar. 4, 2004

(30) Foreign Application Priority Data
Dec. 18, 2001 (JP) .................................... 2001-384199

(51) Int. Cl.$^7$ .............................................. F23N 5/00
(52) U.S. Cl. ................................. 431/75; 431/6; 431/7; 431/12; 431/326; 431/328; 431/62; 431/63
(58) Field of Search .............................. 431/2, 6, 7, 12, 431/75, 326, 328, 170, 62, 63

(56) References Cited

U.S. PATENT DOCUMENTS

| 4,397,356 A | 8/1983 | Retallick |
| 6,048,198 A | 4/2000 | Okada et al. |
| 6,302,683 B1 | 10/2001 | Vestin et al. |
| 6,595,003 B2 * | 7/2003 | Dalla Betta et al. .......... 60/777 |
| 6,718,772 B2 * | 4/2004 | Dalla Betta et al. .......... 60/776 |

FOREIGN PATENT DOCUMENTS

JP          2001-052730          2/2001

* cited by examiner

*Primary Examiner*—Jiping Lu
(74) *Attorney, Agent, or Firm*—McDermott Will & Emery LLP

(57) ABSTRACT

A fuel injector (11) supplies liquid fuel to a catalytic combustor (9) of a fuel reforming device during startup of a fuel reforming device. A controller sets the injection amount (Qf) for liquid fuel to a first injection amount (Qf1) during a predetermined time (t1) after starting fuel injection. After the predetermined time, the injection amount (Qf) is set to a second injection amount (Qf2) which is larger than the first injection amount (Qf1). When the elapsed time after starting fuel injection is smaller than a value (t1), the discharged amount of uncombusted fuel is reduced by setting the injection amount (Qf) to a minimum injection amount (Qf1) which allows ignition and combustion in the catalyst.

8 Claims, 6 Drawing Sheets

CONTROL FOR CATALYTIC COMBUSTOR

FIELD OF THE INVENTION

This invention relates to a catalytic combustor which can be used in a fuel cell system. Furthermore it relates to a method of supplying fuel and a gas containing oxygen to the catalytic combustor.

BACKGROUND OF THE INVENTION

A liquid hydrocarbon fuel such as methanol is reformed by a reformer in order to obtain a gas containing hydrogen which is supplied to a fuel cell. The reformer uses water and fuel in a gaseous state. Consequently a vaporizer or a heat exchanger is generally provided in the fuel cell system in order to vaporize the water and the liquid fuel.

Heat required for the vaporizer or the heat exchanger is often supplied by a combustion gas from a combustor which combusts anode off-gas from the fuel cell with air or which combusts reformate gas with air. However when starting up the fuel cell system, the problem arises that either reformate gas or an anode off-gas to be combusted in the combustor can not be obtained or that the produced amount thereof is insufficient. Tokkai 2001-52730 published by the Japanese Patent Office in 2001 discloses a fuel cell system provided with a catalytic combustor which combusts a part of the liquid fuel to be introduced into the vaporizer or a different liquid fuel with air when starting up the fuel cell system. The combustion gas produced by the catalytic combustor flows into the vaporizer or the heat exchanger.

SUMMARY OF THE INVENTION

However the conventional technique entails the problem that during the period in which the temperature of the catalyst in the catalytic combustor is low, that is to say, when catalyst activity is low, a part of the fuel sprayed into the catalytic combustor is discharged without undergoing combustion.

It is therefore an object of this invention to provide a catalytic combustor which prevents the discharge of uncombusted fuel and which rapidly increases the temperature of various types of reactors such as the vaporizer or the reformer.

In order to achieve above objects, this invention provides a control device for a catalytic combustor, the catalytic combustor having a catalyst for combusting fuel, comprising: a fuel injector for injecting fuel to the catalytic combustor during startup operations of the catalytic combustor; a supply device for supplying an oxygen-containing gas to the catalytic combustor; and a controller coupled to the fuel injector. The controller functions to measure an elapsed time after first commanding the fuel injector to inject fuel; determine whether the elapsed time is greater than a predetermined time; set a fuel injection amount of the fuel injector to a first predetermined injection amount, when the elapsed time is less than or equal to the predetermined time; set the fuel injection amount of the fuel injector to a second predetermined injection amount which is larger than the first predetermined injection amount, when the elapsed time is greater than the predetermined time; and command the fuel injector to inject the set injection amount of fuel.

This invention further provides a control device for a catalytic combustor, the catalytic combustor having a catalyst for combusting fuel, comprising a fuel injector for injecting fuel to the catalytic combustor during startup operations of the catalytic combustor; a supply device for supplying an oxygen-containing gas to the catalytic combustor; a sensor for detecting a temperature of the catalyst; and a controller coupled to the fuel injector and the sensor. The controller functions to determine whether the catalyst temperature (Tc) is greater than a first predetermined temperature (Tc1); set a fuel injection amount of the fuel injector to a first predetermined injection amount, when the catalyst temperature is less than the first predetermined temperature; set the fuel injection amount of the fuel injector to a second predetermined injection amount which is larger than the first predetermined injection amount, when the catalyst temperature is greater than the first predetermined temperature; and command the fuel injector to inject the set injection amount of fuel.

The details as well as other features and advantages of this invention are set forth in the remainder of the specification and are shown in the accompanying drawings.

BRIEF DESCRIPTION OF THE DRAWINGS

In FIGS. 2A to 2C, the solid line represents a first embodiment and the dashed line represents the prior-art technique.

In FIGS. 6A to 6C, the solid line represents a third embodiment and the dashed line represents a first embodiment.

DESCRIPTION OF THE PREFERRED EMBODIMENTS

Figure 1A:
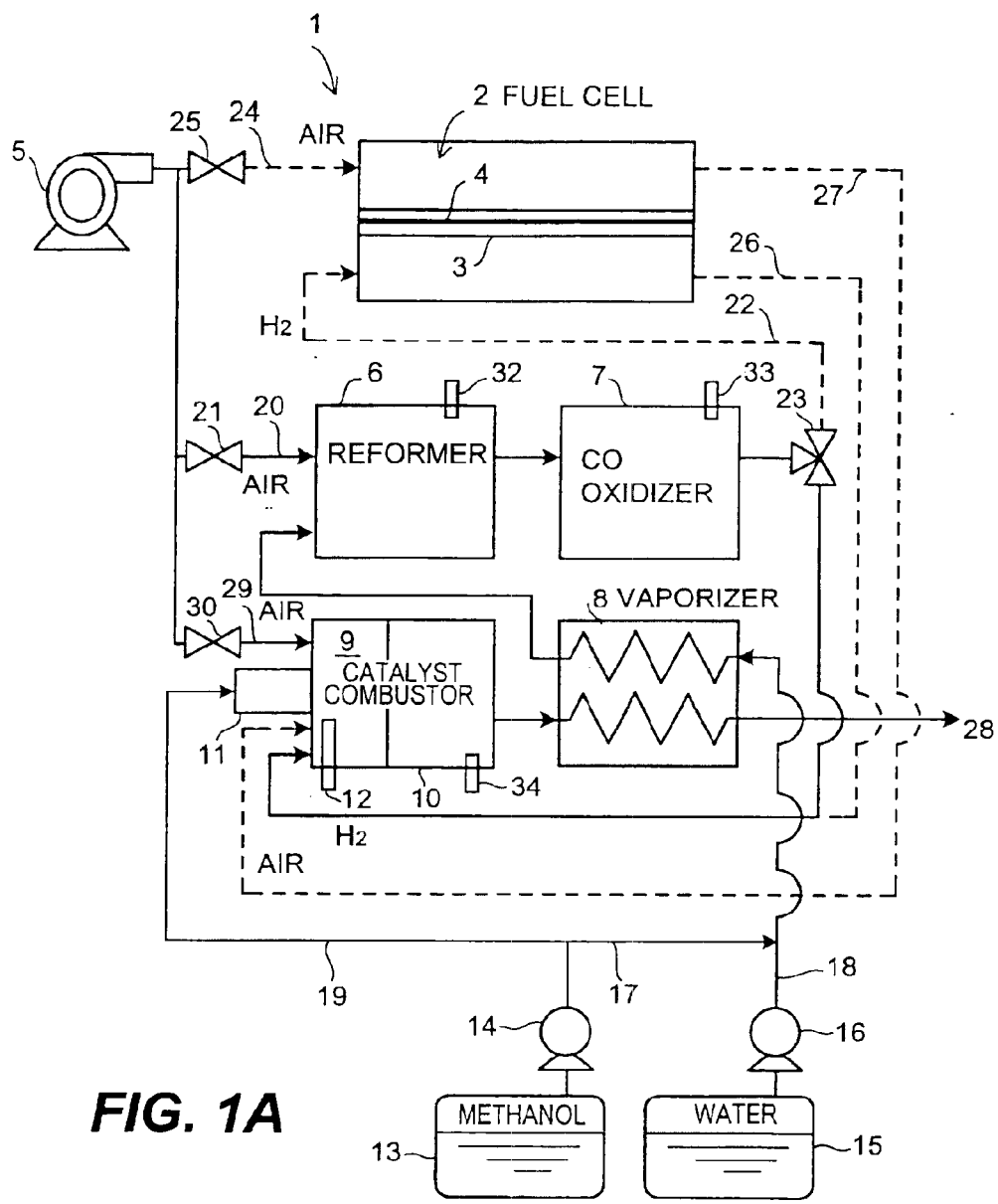
FIG. 1A is a schematic diagram showing an example of a fuel cell system adapted to this invention.
Figure 1B:
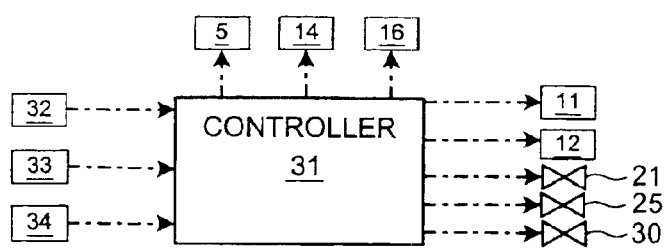
FIG. 1B is a schematic diagram showing a control device for a catalytic combustor.

Referring to FIGS. 1A and 1B, an exemplary fuel cell system 1 comprising a catalytic combustor according to this invention will be described. This fuel cell system comprises a fuel cell 2 which obtains an electromotive force from electrochemical reactions, a compressor 5 for supplying compressed air as a gas containing oxygen, a reformer 6 for producing a gas containing hydrogen from reformate reactions and a catalytic combustor 9 which acts as a source of heat for heat exchange operations in the vaporizer 8. In this description, a gas containing oxygen is sometimes referred to as an "oxygen-containing gas".

The starting materials for reformate reactions are methanol and water which are respectively stored in a methanol tank 14 and a water tank 15. The methanol is transferred to the vaporizer 8 by a first pump 14 which draws up methanol. The water is transferred to the vaporizer 8 by a second pump 16 which draws up water. The steam and the methanol vapor which are created in the vaporizer 8 are transferred to the reformer 6.

In the reformer 6, methanol vapor and steam supplied from the vaporizer 8 through piping 17, 18 are mixed with air supplied from the compressor 5 through piping 20 in order to generate a hydrogen-rich reformate gas by using oxidizing reactions with methanol and steam reforming reactions with methanol. The reformer 6 is an auto-thermal type which can omit a separate heating element. In an auto-thermal reformer, the amount of heat required for endothermic steam reforming reactions is supplemented by the amount of heat produced by exothermic oxidizing reactions. A CO oxidizer 7 is provided between the fuel cell 2 and the reformer 6 in order to prevent poisoning of the fuel cell 2 resulting from carbon monoxide contained in the reformate gas supplied to the anode 3 of the fuel cell 2.

Compressed air is supplied to the cathode 4 of the fuel cell 2 from the compressor 5 through piping 24. Reformate gas from the CO oxidizer 7 is supplied to the anode 3 through piping 22. In this manner, the fuel cell 2 generates power using electrochemical reactions.

The anode off-gas and cathode off-gas not used in power generation by the fuel cell 2 are transferred to the catalytic combustor 9 by designated piping 26, 27 and combusted by the combustion catalyst 10 for combusting fuel. The high-temperature combustion gas produced by combustion operations is used to vaporize water and liquid fuel in the vaporizer 8 connected downstream of the combustion catalyst 10 and is then discharged from the piping 28. The vaporizer 8 performs heat exchange operations between the liquid fuel and the combustion gas and between the combustion gas and water in order to vaporize the water and the liquid fuel.

Further, at least when starting the reformer or the fuel cell system 1, in other words, during startup operations of the catalytic combustor, air is introduced into the catalytic combustor 9 through piping 29 and the compressor 5, and liquid fuel is supplied through a fuel injector 11, piping 19 and a first pump 14 which draws up methanol. The air and methanol are mixed and the resultant gaseous mixture of methanol and air is introduced into the combustion catalyst 10 and combusted by the combustion catalyst 10. A glow plug 12 is provided between the combustion catalyst 10 and the fuel injector 11 of the catalytic combustor 9 in order to forcibly ignite the gaseous mixture of methanol and air. High-temperature combustion gases produced by combustion operations in the combustion catalyst 10 are discharged from the piping 28 after being used in order to vaporize the water and fuel in the vaporizer 8.

The controller 31 is a microcomputer comprising a central processing unit (CPU), a read only memory (ROM), a random access memory (RAM) and an input/output interface (I/O interface). These elements are connected by a bus. The controller 31 may comprise a plurality of microcomputers.

The controller 31 controls the flow rate of air and flow rate of fuel supplied to the catalytic combustor 9 when starting up the fuel cell system, in other words, during startup operations of the catalytic combustor. Temperature signals from a first temperature sensor 32 for detecting the temperature of the reformer 6, a second temperature sensor 33 for detecting the temperature of the CO oxidizer 7 and a third temperature sensor 34 for detecting the temperature of the combustion catalyst are inputted into the controller 31 through the I/O interface. The controller 31 uses these detected temperatures when controlling the operation of the compressor 5, the fuel injector 11, the glow plug 12, the first, second and third air flow control valves 21, 25, 30 which control the flow rate of air, and the gas flow control valve 23 which regulate the flow rate and flow direction of the reformate gas. The compressor 5, the fuel injector 11, the glow plug 12, the first, second and third air flow control valves 21, 25, 30, and the gas flow control valve 23 operate in response to a command signal from the controller 31. The first air flow control valve 21 regulates the amount of air supplied to the reformer 6 from the compressor 5. The second air flow control valve 25 regulates the amount of air supplied to the fuel cell 2 from the compressor 5. The third air flow control valve 30 regulates the amount of air supplied to the catalytic combustor 9 from the compressor 5.

Next a method of supplying air and fuel to the catalytic combustor during startup operations will be described. As described above, during power generation operations of the fuel cell 2, the catalytic combustor 9 combusts anode off-gas and cathode off-gas not used during power generation by the fuel cell 2. The high-temperature combustion gas produced by the catalytic combustor 9 is used as a source of heat for vaporizing water and fuel in the vaporizer 8. On the other hand, when starting up the fuel cell system, the catalytic combustor 9 combusts a gaseous mixture of air supplied from the compressor 5 and liquid fuel supplied from the fuel injector 11 because anode off-gas and cathode off-gas can not be obtained from the fuel cell 2.

Figures 2A, 2B, 2C:
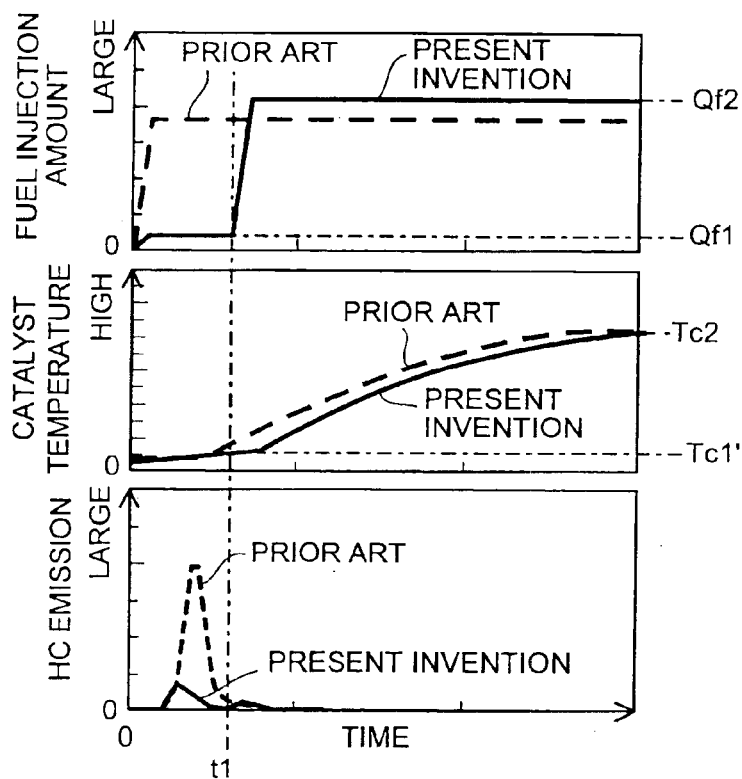
FIG. 2A is a graph showing the relationship between the fuel injection amount and elapsed time after the start of fuel injection with respect to the prior-art technique and the embodiments of this invention.
FIG. 2B is a graph showing the relationship of catalyst temperature to elapsed time after the start of fuel injection.
FIG. 2C is a graph showing the relationship of the HC discharge amount to elapsed time after the start of fuel injection.

Referring to FIGS. 2A–C, in the prior-art technique, although a fixed amount of fuel injection is performed as a result of a command from a controller, the catalyst activity is insufficient due to the low catalyst temperature. Consequently a part of the supplied fuel is discharged from the catalytic combustor 9 without undergoing combustion.

Referring again to FIGS. 2A–C, according to this invention, the amount of fuel which is discharged without undergoing combustion (HC emission) is reduced by setting the injection amount of liquid fuel supplied to the catalytic combustor 9 to a first predetermined injection amount Qf1 during a predetermined time t1 after commencing startup operations, that is to say, after starting fuel injection. The first predetermined injection amount Qf1 represents the minimum injection amount at which ignition of the fuel by the combustion catalyst 10 in the catalytic combustor 9 is realized.

The predetermined time t1 represents the time required for the combustion catalyst 10 of the catalytic combustor 9 to reach an activation temperature Tc1' after starting fuel injection. The predetermined time t1 is determined experimentally by measuring the time dependency of the combustion ratio for fuel flowing into the catalyst. The activation temperature Tc1' is defined as a catalyst temperature at which a predetermined percentage (50%–90%) of fuel flowing into the catalyst is combusted. When the activation temperature is defined as a catalyst temperature at which 50% of fuel flowing into the catalyst is combusted, the activation temperature Tc1' is about 60° C.

When the activity of the combustion catalyst 10 during the predetermined time t1 is insufficient, a part of the supplied fuel is discharged from the catalytic combustor 9 without undergoing combustion. When the predetermined time t1 elapses after starting fuel injection, a majority of fuel is combusted because the combustion catalyst 10 is activated due to temperature increases resulting from combustion.

After the predetermined time t1, the controller 31 set the fuel injection amount to a second predetermined injection amount Qf2 which is larger than the first predetermined injection amount Qf1. Here, the operation of the catalytic combustor 9 after the predetermined time t1 is referred as steady-state operation. In steady-state operation after the predetermined time t1, since the combustion catalyst 10 has reached an activation temperature Tc1', the increase in the generated heat creates a rapid temperature increase in both the combustion catalyst 10 and in the vaporizer 8 disposed downstream thereof.

The catalytic combustor 9 is provided with a glow plug 12 which is employed to forcibly ignite the gaseous mixture during the predetermined time t1 after starting fuel injection. This allows the discharged amount of uncombusted fuel to be further reduced because the first injection amount Qf1 is set to a smaller value. In addition, the air flow supplied to the catalytic combustor 9 is controlled such that the excess-air ratio $\lambda$ is fixed independently of the variation in the fuel injection amount. This enables the combustion temperature to be controlled to a suitable temperature.

Here, the excess-air (excess-gas) ratio $\lambda$ represents the flow rate of oxygen-containing gas (which is air in this description) divided by the minimum gas flow rate required for achieving complete combustion of fuel. In other words, the excess-air ratio $\lambda$ represents the gas/fuel ratio in the catalytic combustor 9 divided by the stoichiometric gas/fuel ratio. At an excess-air ratio grater than 1, the fuel injected to the catalytic combustor 9 is completely combusted.

Figure 3:
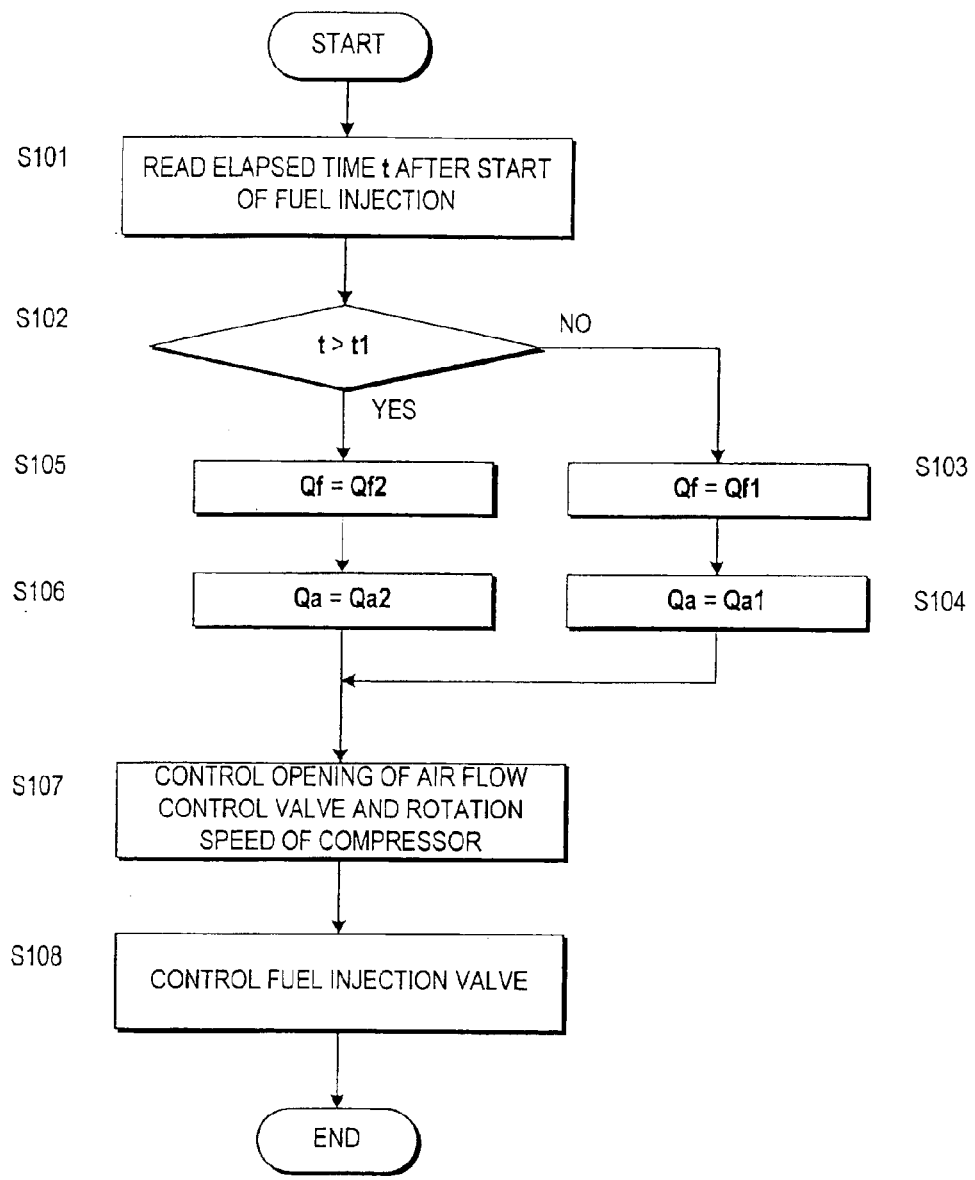
FIG. 3 is a flowchart showing a control routine performed by a controller according to a first embodiment.

Referring now to FIG. 3, a control routine executed by the controller 31 during startup operations for the catalytic combustor 9 will be described. The control routine is executed periodically using a timer interrupt at a fixed interval. The fixed interval takes a value of 0.5–2 seconds.

Firstly in a step S101, the elapsed time t after the start of fuel injection is read. The time t is set to a value of 0 at the start of the initial control routine. When the controller 31 starts the fuel injector injecting fuel, it starts to measure the elapsed time. Namely, the controller 31 measures an elapsed time after first commanding the fuel injector to inject fuel.

In a step S102, it is determined whether the elapsed time t after the start of fuel injection is greater than a predetermined time t1. When the elapsed time t is less than or equal to the predetermined time t1, the routine proceeds to a step S103 where the fuel injection amount Qf is set to a first predetermined injection amount Qf1.

In a step S104, the air flow rate Qa is set to an air flow rate Qa1 at which a fixed excess-air ratio $\lambda$ is achieved for the first injection amount Qf1. Then, the routine proceeds to a step S107. The fixed excess-air ratio $\lambda$t is an excess-air ratio which realizes a combustion catalyst temperature of 400 to 800° C. during the steady-state operation of the catalytic converter 9, and ranges from 3 to 5.

In the step S102, when the elapsed time t is greater than the predetermined time t1, the routine proceeds to a step S105 where the fuel injection amount Qf is set to a second injection amount Qf2. It should be noted that the second injection amount Qf2 is greater than the first injection amount Qf1.

In a step S106, the air flow rate Qa is set to an air flow rate Qa2 for achieving the fixed excess-air ratio $\lambda$t at the second injection amount Qf2. Then, the routine proceeds to the step S107.

In the step S107, the opening of the third air flow control valve 30 and the rotation speed of the compressor 5 are controlled so as to produce the set air flow rate Qa. For example, this control may be realized by looking up a table which specifies the opening of the air flow control valve 30 and the rotation speed of the compressor 5 with respect to the air flow rate Qa and which is experimentally determined.

In a step S108, control of the fuel injector 11 is performed based on the injection amount Qf set in the step S103 or the step S105. Namely, the controller commands the fuel injector 11 to inject the set injection amount Qf of fuel.

Next a second embodiment related to a method of supplying air and fuel to the catalytic combustor during startup operations will be described.

A temperature sensor 34 as shown in FIG. 1 detects the temperature of the combustion catalyst 10. At temperatures lower than the catalyst activation temperature Tc1', the injection amount Qf of liquid fuel supplied to the catalytic combustor 9 is set to a first predetermined injection amount Qf1, that is to say, to the minimum injection amount which can realize ignition in the catalyst. In this manner, the discharge amount of uncombusted fuel can be reduced. At temperatures greater than or equal to the catalyst activation temperature Tc1', the fuel injection amount Qf is set to a second predetermined injection amount Qf2 which is greater than the first predetermined injection amount Qf1. Above the catalyst activation temperature Tc1', approximately all of the supplied fuel is combusted. Thereafter the second predetermined injection amount Qf2 is maintained and the catalyst activation is further enhanced because of temperature increases resulting from combustion. Thereafter the catalyst temperature gradually reaches a second predetermined temperature Tc2, which is a steady-state temperature of the catalyst during the steady-state operation. In other words, the second predetermined injection amount Qf2 is a fuel injection amount which realizes the second predetermined temperature Tc2 under steady-state operating conditions of the catalytic converter.

Here, the second predetermined temperature Tc2 is set to be greater than or equal to a lower limiting temperature of 400° C. at which at least 99% of fuel flowing into the catalyst undergoes combustion. Further, the second predetermined temperature Tc2 is set to less than a maximum allowable temperature of the catalyst, which is approximately 800° C. and which is determined on the basis of the heat resistant characteristics of the catalyst. For example, the second predetermined temperature Tc2 is set to approximately 600° C. In this manner, rapid temperature increases are realized in the combustion catalyst 10 and in the vaporizer 8 which is provided downstream thereof. Furthermore control of the fuel injection amount based on the actual catalyst temperature enables accurate control of the catalyst temperature.

The gaseous mixture of fuel and air may be forcibly ignited by a glow plug 12 at temperatures less than a catalyst activation temperature Tc1' so as to further reduce discharge amount of uncombusted fuel.

Furthermore, to realize a suitable temperature, the air flow supplied to the catalyst combustor 9 is controlled in a manner that the excess-air ratio $\lambda$ is fixed independently of the variation in the fuel injection amount.

Figure 4:
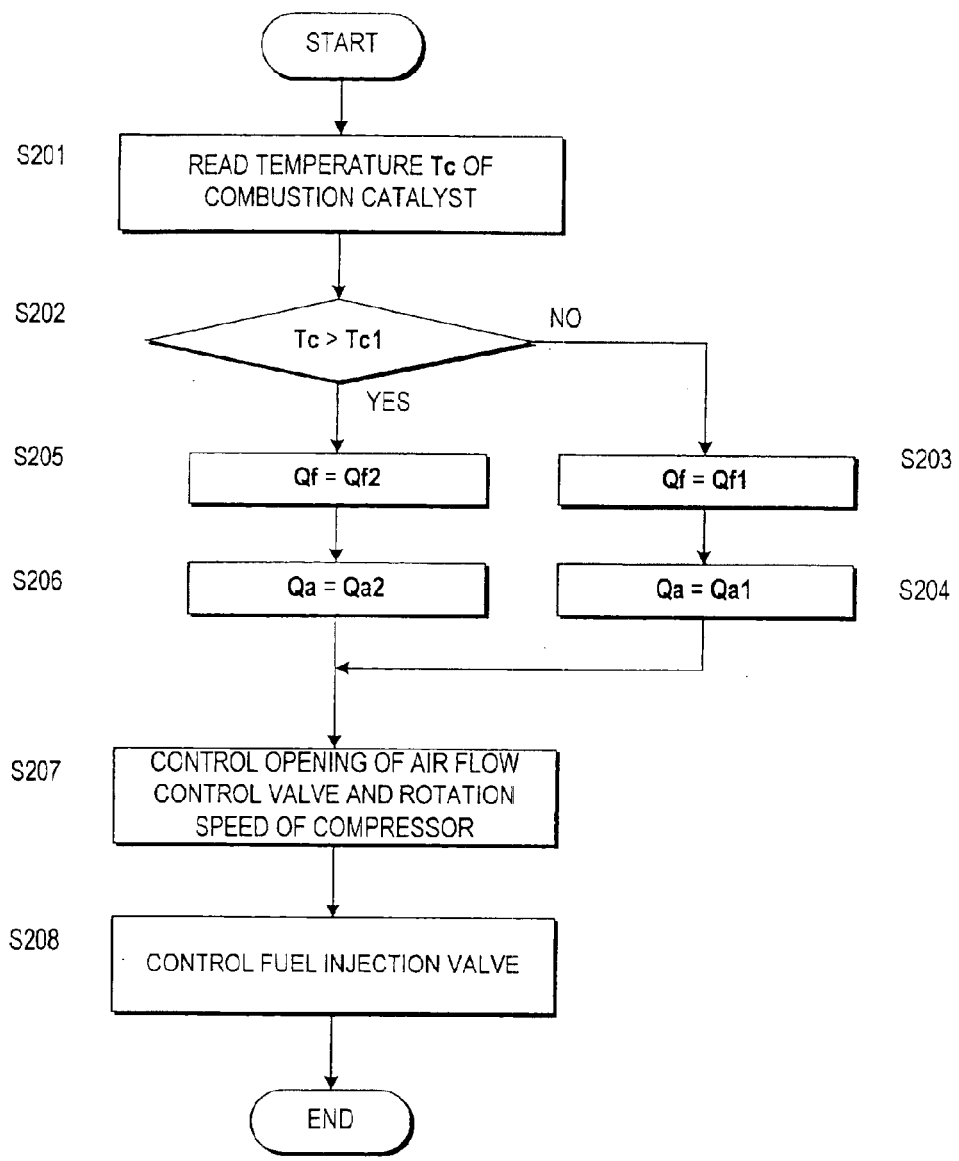
FIG. 4 is a flowchart showing a control routine performed by a controller according to a second embodiment.

Referring now to FIG. 4, a control routine according to a second embodiment which is executed by the controller 31 during startup operations of the catalyst combustor 9 will be described. The control routine is executed periodically using a timer interrupt at a fixed interval. The fixed interval takes a value of 10–100 milliseconds.

In a step S201, the temperature Tc of the combustion catalyst 10 is read using the temperature sensor 34.

Then in a step S202, it is determined whether the catalyst temperature Tc is greater than a first predetermined temperature Tc' which is equal to an activation temperature Tc1'. When the catalyst temperature Tc is less than the first predetermined temperature Tc1, the routine proceeds to a step S203 where the fuel injection amount Qf is set to a first injection amount Qf1.

Then in a step S204, the air flow rate Qa is set to an air flow rate Qa1 in order to achieve a fixed excess-air ratio $\lambda t$ at the first injection amount Qf1. Then, the routine proceeds to a step S207. The fixed excess-air ratio $\lambda t$ ranges from 3 to 5.

When it is determined in the step S202 that the catalyst temperature Tc is greater than the first predetermined temperature T1 the routine proceeds to a step S205 where the fuel injection amount Qf is set to a second injection amount Qf2. It should be noted that the second injection amount Qf2 is greater than the first injection amount Qf1.

In a step S206, the air flow rate Qa is set to an air flow rate Qa2 which produces the fixed excess-air ratio $\lambda t$ corresponding to the second injection amount Qf2. Thereafter the routine proceeds to a step S207.

In the step S207, the opening of the air flow control valve 30 and the rotation speed of the compressor 5 are controlled so that the set air flow rate Qa is realized. Then in a step S208, the fuel injector 11 is controlled based on the injection amount Qf set in the step S203 or the step S205.

A third embodiment related to a method of supplying air and fuel during startup operations of the catalytic combustor will be described hereafter. In this embodiment, the controller 31 executes a control routine which is the same as the control routine according to the first or the second embodiment. Moreover the fuel injection amount control is the same as that executed in the first and the second embodiments. The point of difference in this embodiment from the first and the second embodiments resides in the setting of the air flow rate as described hereafter.

Figure 5:
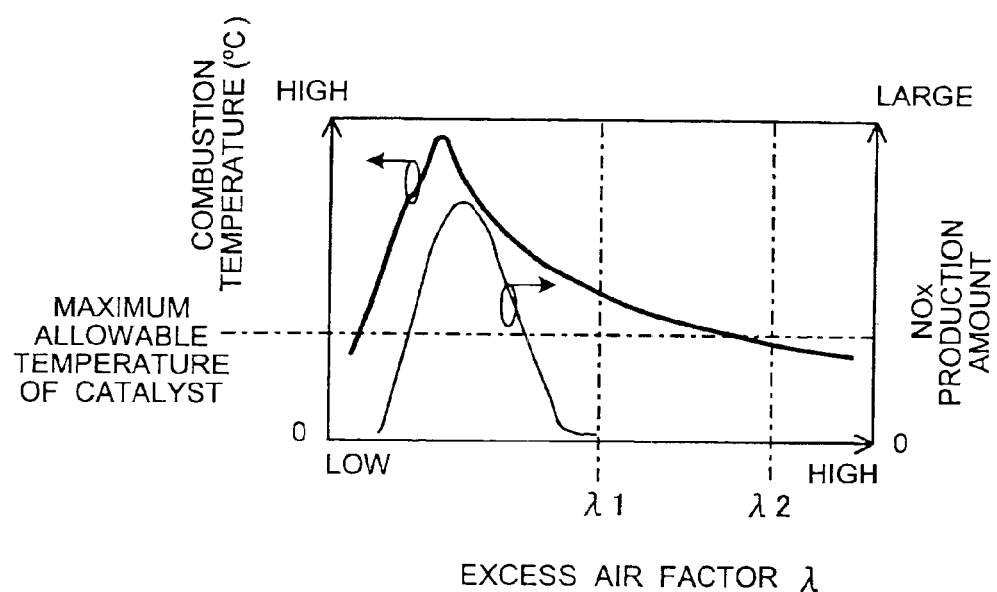
FIG. 5 is a graph showing the relationship of the produced amount of nitrogen oxides to the excess-air ratio and the relationship of the combustion temperature to the excess-air ratio, in relation to the catalytic combustor.

FIG. 5 shows the combustion temperature and the produced amounts of nitrogen oxide as a function of an excess-air ratio $\lambda$. The combustion temperature and the produced amount of nitrogen oxide take a maximum value at an excess-air ratio of about 1. The excess-air ratio in the catalytic combustor 9 is always set to a higher excess-air ratio than an excess-air ratio at which the combustion temperature or the produced amount of nitrogen oxides take a maximum value. Though the excess-air ratio $\lambda$ is fixed to a constant value $\lambda t$ in the first and second embodiments, the excess-air ratio $\lambda$ is varied according to the elapsed time or the temperature of the combustion catalyst 10, in the third embodiment.

Figures 6A, 6B, 6C:
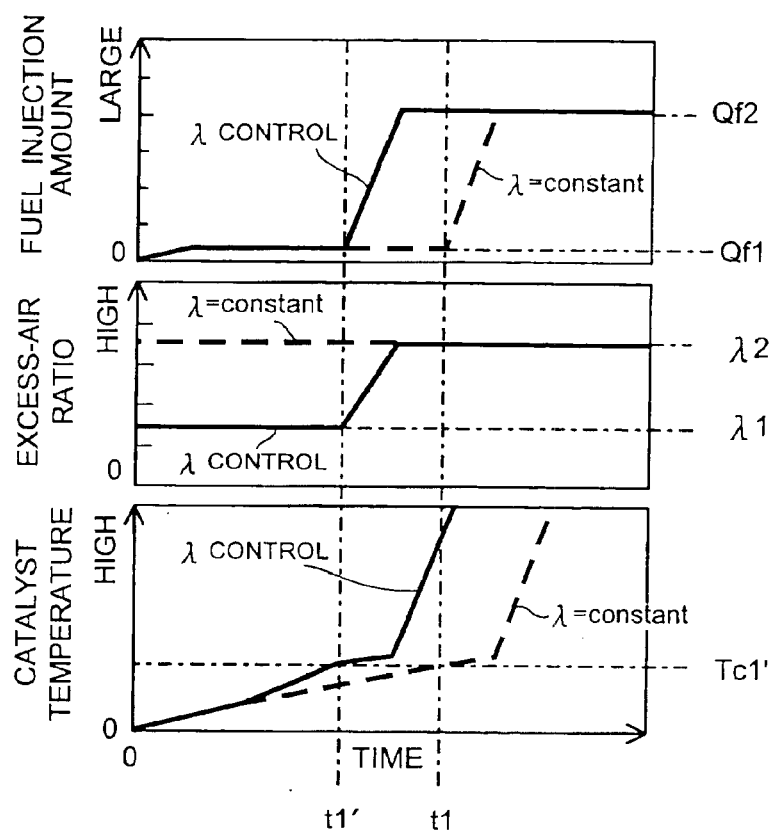
FIG. 6A is a graph showing the relationship of the fuel injection amount to elapsed time after the start of fuel injection with respect to the first and third embodiments of this invention.
FIG. 6B is a graph showing the relationship of the excess-air ratio to elapsed time after the start of fuel injection with respect to the first and third embodiments.
FIG. 6C is a graph showing the relationship of the catalyst temperature to elapsed time after the start of fuel injection according to the first and third embodiments.

In this embodiment, control of the air flow rate is performed as shown in FIGS. 6A–C using a first and a second excess-air ratios $\lambda 1$, $\lambda 2$. The excess-air ratio for attaining the temperature of the combustion catalyst 10 between the first predetermined temperature T1 and the maximum allowable temperature is taken to be a second excess-air ratio $\lambda 2$. The maximum allowable temperature for the catalyst is determined by taking into account the heat-resistant characteristics of the combustion catalyst 10. On the other hand, the first excess-air ratio $\lambda 1$ is set to a smaller value than $\lambda 2$, and is set so that the produced amount of nitrogen oxide falls within an allowable range. The first excess-air ratio $\lambda 1$ is preferably the lowest value at which an amount of nitrogen oxide produced by the combustion of fuel is in an allowable range. The first excess-air ratio $\lambda 1$ takes a value of 2 to 3. The second excess-air ratio $\lambda 2$ takes a value of 4 to 5.

When the elapsed time t after the start of fuel injection is determined to be less than or equal to the predetermined time t1 in the step S102 in FIG. 3, the controller 31 sets the air flow rate Qa to an air flow rate which attains the first excess-air ratio $\lambda 1$ for the fuel injection amount Qf1, in the step S104. When the catalyst temperature is determined to be lower than or equal to the predetermined temperature T1 in the step S202 in FIG. 4, the controller 31 sets the air flow rate Qa to an air flow rate which attains the first excess-air ratio $\lambda 1$ for the fuel injection amount Qf1, in the step S204. This allows a high combustion temperature and the resulting rapid temperature increase in the catalyst. As shown in FIG. 6C, the elapsed time after the start of the fuel injection until the catalyst reaches an activation temperature is shortened to an elapsed time t1' in comparison to the elapsed time t1 when an excess-air ratio $\lambda$ is maintained to the second excess-air ratio $\lambda 2$ during startup operations of the catalytic combustor.

When the elapsed time t after the start of fuel injection is determined to be greater than the predetermined time t1 in the step S102 in FIG. 3, the controller 31 sets the air flow rate Qa to an air flow rate which attains the second excess-air ratio $\lambda 2$ in response to the fuel injection amount Qf2, in the step S106. When it is determined that the catalyst temperature has increased to greater than or equal to a predetermined temperature T1 in the step S202, the controller 31 sets the air flow rate Qa to an air flow rate which attains the second excess-air ratio $\lambda 2$ in response to the fuel injection amount Qf2, in the step S206. In this manner, deterioration is avoided in the catalyst by avoiding excessive increase in the catalyst temperature. Furthermore this embodiment allows the discharged amount of uncombusted fuel to be reduced while realizing more rapid temperature increase in the combustion catalyst 10 and the vaporizer 8.

In each embodiment above, although the catalytic combustor 9 is adapted to be the source of combustion gases to the vaporizer 8, this invention is not limited in this respect. The catalytic combustor 9 may be adapted as a source of heat supplied to the catalyst of the fuel cell or the reformer during startup operations.

The entire contents of Japanese Patent Application P2001-384199 (filed Dec. 18, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

INDUSTRIAL APPLICABILITY

A control device and control method according to this invention can be applied to a catalytic combustor, especially to a catalytic combustor used in a fuel reforming system or a fuel cell system.

What is claimed is:

1. A control device for a catalytic combustor, the catalytic combustor having a catalyst for combusting fuel, comprising:
   a fuel injector for injecting fuel to the catalytic, combustor during startup operations of the catalytic combustor;
   a supply device for supplying an oxygen-containing gas to the catalytic combustor;

a sensor for detecting the temperature of the catalyst; and a controller coupled to the fuel injector, functioning to;

set of fuel injection amount of the fuel injector to a first predetermined injection amount, when the catalyst temperature is less than a first predetermined temperature;

set the fuel injection amount of the fuel injector to a second predetermined injection amount which is larger than the first predetermined injection amount, when the catalyst temperature is greater than the first predetermined temperature; and command the fuel injector to inject the set injection amount of fuel.

2. The control device as defined in claim 1, further comprising a flow control valve for regulating a flow rate of oxygen-containing gas supplied to the catalytic combustor;

wherein the controller further functions to:

calculate a flow rate of oxygen-containing gas for achieving a fixed excess-air ratio in response to the set fuel injection amount; and command the flow control valve to achieve the calculated flow rate of oxygen-containing gas.

3. The control device as defined in claim 1, further comprising a flow control value for regulating the flow rate of oxygen-containing gas supplied to the catalytic combustor;

wherein the controller further functions to;

calculate a flow rate of oxygen-containing gas supplied to the catalytic combustor;

wherein the controller further functions to:

calculate a flow rate of oxygen-containing gas for achieving a first excess-air ration when the catalyst temperature is less than a first predetermined temperature; and calculate a flow rate of oxygen-containing gas for achieving a second excess-air ratio when the catalyst temperature is greater than the first predetermined temperature, wherein the second excess-air ratio is higher than the first excess-air ratio; and command the flow control valve to achieve the calculated flow rate of oxygen-containing gas.

4. The control device as defined in claim 3, wherein the first excess-air ratio is the lowest value at which an amount of nitrogen oxide produced by the combustion of fuel is in an allowable range; and the second excess-air ratio is an excess-air ratio at which the catalyst temperature coincides with a second predetermined temperature under steady-state operating conditions of the catalytic combustor, wherein the second predetermined temperature is higher than the first predetermined temperature and lower than a maximum allowable temperature of the catalyst.

5. The control device as defined in claim 1, further comprising a glow plug for igniting the fuel, the glow plug being provided in the catalytic combustor between the fuel injector and the catalyst.

6. The control device as defined in claim 7, wherein the amount allowing ignition of the fuel in the catalyst; and the second predetermined injection amount is an injection amount at which a temperature of the catalyst reaches a second predetermined temperature under steady-state operating conditions of the catalytic combustor, wherein the second predetermined temperature is higher than the first predetermined temperature and lower than a maximum allowable temperature of the catalyst.

7. A method for controlling an operation of a catalytic combustor, the catalytic combustor having a catalyst for combusting fuel, comprising:

supplying an oxygen-containing gas to the catalytic combustor;

detecting a temperature of the catalyst;

determining whether the catalyst temperature is greater than a first predetermined temperature;

setting a fuel injection amount of the fuel injector to a first predetermined injection amount, when the catalyst temperature is less than the first predetermined temperature;

setting the fuel injection amount of the fuel injector to a second predetermined injection amount which is larger than the first predetermined injection amount, when the catalyst temperature is greater than the first predetermined temperature; and injecting the set injection amount of fuel to the catalytic combustor.

8. A control device for a catalytic combustor, the catalytic combustor having a catalyst for combusting fuel, comprising:

means for supplying an oxygen-containing gas to the catalytic combustor;

means for detecting a temperature of the catalyst;

means for determining whether the catalyst temperature is greater than a first predetermined temperature;

means for setting a fuel injection amount of the fuel injector to a first predetermined injection amount, when the catalyst temperature is less than the first predetermined temperature;

means for setting the fuel injection amount of the fuel injector to a second predetermined injection amount which is larger than the first predetermined injection amount, when the catalyst temperature is greater than the first predetermined temperature; and means for injecting the set injection amount of fuel to the catalytic combustor.

* * * * *